(12) United States Patent
Vainstein

(10) Patent No.: US 10,496,820 B2
(45) Date of Patent: Dec. 3, 2019

(54) APPLICATION BEHAVIOR INFORMATION

(71) Applicant: Microsoft Technology Licensing, LLC, Redmond, WA (US)

(72) Inventor: Maxim Vainstein, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 15/244,538

(22) Filed: Aug. 23, 2016

(65) Prior Publication Data

US 2018/0060583 A1    Mar. 1, 2018

(51) Int. Cl.
*G06F 21/56* (2013.01)
*G06F 21/62* (2013.01)

(52) U.S. Cl.
CPC ........ *G06F 21/566* (2013.01); *G06F 21/6281* (2013.01)

(58) Field of Classification Search
CPC .................................................... G06F 21/566
USPC .......................................................... 726/23
See application file for complete search history.

(56) References Cited

U.S. PATENT DOCUMENTS

| | | | |
|---|---|---|---|
| 7,676,843 B1 | 3/2010 | Stott et al. | |
| 8,074,272 B2 | 12/2011 | Choi et al. | |
| 8,281,410 B1 | 10/2012 | Sobel et al. | |
| 8,413,167 B2 | 4/2013 | Biggs | |
| 8,595,834 B2 | 11/2013 | Xie et al. | |
| 8,990,940 B2 | 3/2015 | Hay et al. | |
| 9,147,072 B2 | 9/2015 | Fawaz et al. | |
| 9,159,035 B1 | 10/2015 | Ismael et al. | |
| 9,183,383 B1 | 11/2015 | Yablokov et al. | |
| 2008/0016339 A1 | 1/2008 | Shukla | |
| 2009/0100520 A1 | 4/2009 | Reasor et al. | |
| 2011/0209219 A1* | 8/2011 | Zeitlin | G06F 21/554 726/23 |
| 2012/0072991 A1 | 3/2012 | Belani et al. | |
| 2012/0167218 A1 | 6/2012 | Poornachandran et al. | |
| 2012/0290640 A1 | 11/2012 | Mahaffey et al. | |
| 2012/0317645 A1 | 12/2012 | Fortier | |
| 2016/0014149 A1 | 1/2016 | Bradley et al. | |

FOREIGN PATENT DOCUMENTS

WO    2012027588 A1    3/2012

OTHER PUBLICATIONS

Khanse, Anand, "Make Windows Defender protect you against Potentially Unwanted Programs too", Published on: Dec. 5, 2015 Available at: http://www.thewindowsclub.com/windows-defender-potentially-unwanted-programs, 8 pages.
"International Search Report and Written Opinion Issued in PCT Application No. PCT/US2017/047242", dated Oct. 9, 2017, 10 Pages.

* cited by examiner

*Primary Examiner* — Jacob Lipman

(57) ABSTRACT

Described herein are various technologies pertaining to providing information to a user regarding behavior of a potentially unwanted application. In response to this information, the user can determine action(s) to take regarding the potentially unwanted application. Further, optionally, based upon action(s) taken by the user, an adaptive component can modify information collected by a collector component.

20 Claims, 7 Drawing Sheets

APPLICATION BEHAVIOR INFORMATION

BACKGROUND

As computer software has become more sophisticated, it has become easier for users to use. For example, many computer software applications employ user friendly interfaces to receive user input and provide information to user. However, with this sophistication, even savvy computer users have become less knowledgeable about actions that the software is actually performing on their computer system.

Additionally, when executing a software application on a computer system, protection services (e.g., malware software) have generally been a result of a binary decision. The software application was either blocked because it was a known threat or allowed to run.

SUMMARY

Described herein is a system and method for providing information regarding a potentially unwanted application. The system can provide information to a user regarding a potentially unwanted application in order to allow the user to provide determine action(s) to take regarding the potentially unwanted application.

The system includes a potential unwanted application identification component that reviews an application and identifies the application as a potentially unwanted application. The potential unwanted application identification component can identify the application as a potentially unwanted application based on, for example, user-specified setting(s), enterprise-specified setting(s), information obtained from a service (e.g., cloud-based service), unfamiliarity of an anti-malware engine with the application (e.g., initial loading of the application on a computer system) and the like.

Based on identification of the application as being a potentially unwanted application, a collector component can collect information regarding behavior and/or suspicious activity(ies) of the application. The collected information can be aggregated by an aggregation component that can then format the aggregated information (e.g., into a user-friendly presentation). The aggregation component can provide the aggregated information to an output component which can provide the aggregated information to a user.

The system further includes an input component that receives user input regarding an action to be taken in response to presentation of the aggregated information. Based on the received user input regarding an action, an action component takes an action regarding the application. Example actions include allowing the application to execute without interruption, providing additional information to the user regarding the application and/or the suspicious activity(ies) via the output component and/or blocking the application from running.

Another example action is to execute the application in a reduced access mode (e.g., partial sandbox) in which the application is allowed to run. However, in this reduced access mode, the application will fail to perform particular operation(s). Another example action is to execute the application in a controlled access mode in which the application is allowed to execute but is provided control data in response to request(s) for user data and/or information about the user's computer.

Optionally, based upon action(s) taken by the user, an adaptive component can modify information collected by the collector. For example, over a period of time, the adaptive component can learn that a user is not concerned with a particular action (e.g., modification of registry). Based upon the user's action over the period of time, the adaptive component can notify the collector component that the particular action is not of concern to the user. Based upon this notification, the collector component and/or the aggregation component can modify their behavior (e.g., by not collecting information regarding the particular action).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
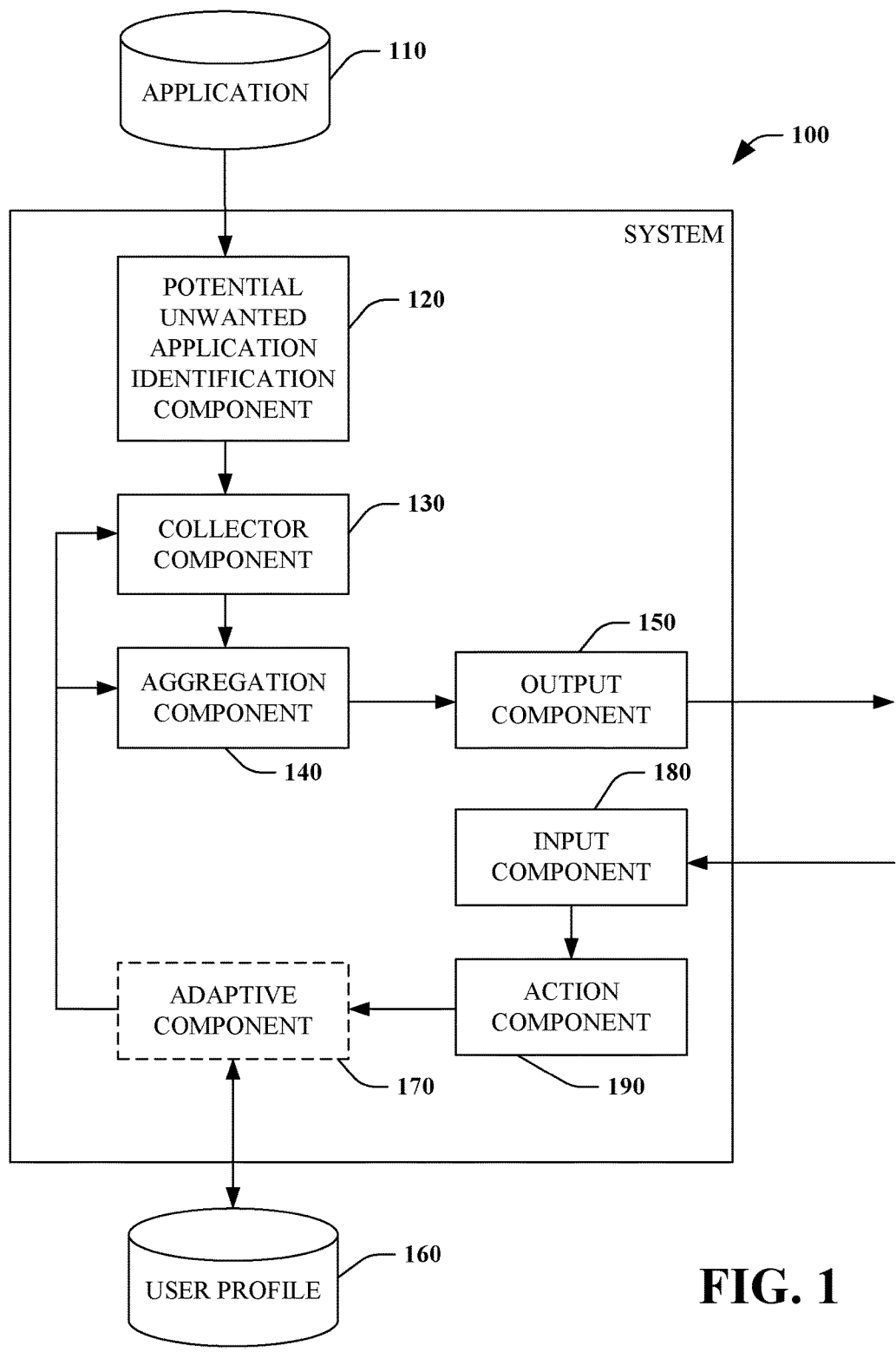
FIG. 1 is a functional block diagram that illustrates a system for providing information regarding a potentially unwanted application.

Various technologies pertaining to providing information regarding a potentially unwanted application are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding providing information regarding a potentially unwanted application. What follows are one or more exemplary systems and methods.

Aspects of the subject disclosure pertain to the technical problem of providing information to a user regarding behavior of a potentially unwanted application in order to allow the user to provide determine action(s) to take regarding the potentially unwanted application. The technical features associated with addressing this problem involve identifying the potentially unwanted application. Based upon identification of the potentially unwanted application, information regarding actions taken by the potentially unwanted application is collection during execution of the potentially unwanted application. The collected information is aggregated and information regarding the aggregated collected information is provided to a user (e.g., in a user-friendly manner). In response, the user can provide an action to take regarding the potentially unwanted application. Accordingly, aspects of these technical features exhibit technical effects of taking an action specified by the user regarding the potentially unwanted application.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for providing information regarding a potentially unwanted application 100 is illustrated. The system 100 can provide information to a user regarding a potentially unwanted application 110 in order to allow the user to provide determine action(s) to take regarding the potentially unwanted application.

The system 100 includes a potential unwanted application identification component 120 that reviews an application 110 and identifies the application as a potentially unwanted application. "Potentially unwanted application" refers to an application which not malware and performs potentially unwanted action(s). For example, the potentially unwanted application may perform action(s) that compromise security of information stored on a user's computer, may communicate with computer(s) in physically remote location(s), perform damaging action(s) to a user's computer (e.g., deleting and/or modifying file(s)), perform surreptitious act(s) (e.g., reads file(s)), modify setting(s) of a user's computer (e.g., registry, change browser setting(s), etc.), utilize component(s) of a user's computer (e.g., display, keyboard, mouse, camera, microphone, modem connection, Bluetooth connection, network connection, scanner, printer, hard drive, flash drive and the like). Many applications perform these potentially unwanted actions for legitimate purposes and for the benefit of the user. However, other application may perform these potentially unwanted action for commercial purposes (e.g., monitoring behavior for marketing purposes) and even illicit purposes (e.g., monitoring camera and/or microphone inputs surreptitiously).

For example, the application 110 can be a computer game that accesses information regarding a physical location of the user (e.g., access GPS information of a phone running the application). Certain users may be willing to allow the application 110 to have access to this information while other users may guard this information and not be willing to share this information with the application 110.

The potential unwanted application identification component 120 can identify the application 110 as a potentially unwanted application based on, for example, user-specified setting(s), enterprise-specified setting(s), information obtained from a service (e.g., cloud-based service), unfamiliarity of an anti-malware engine with the application 110 (e.g., initial loading of the application 110 on a computer system) and the like.

Based on identification of the application 110 as being a potentially unwanted application, a collector component 130 can collect information regarding behavior of the application 110. For example, the collector component can collect (e.g., track and/or log) information regarding one or more of the following suspicious actions taken by the application: communication with computer(s) in physically remote location(s), performance of potentially damaging action(s) to a user's computer (e.g., deleting and/or modifying file(s) and/or directory(ies)), performing surreptitious act(s) (e.g., reads file(s)), modifying setting(s) of a user's computer (e.g., registry, change browser setting(s), etc.), utilizing hardware and/or software component(s) of a user's computer (e.g., querying a database via a database application, display, keyboard, mouse, camera, microphone, modem connection, Bluetooth connection, network connection, scanner, printer, hard drive, flash drive, etc.) and the like. Those skilled in the art will recognize that the subject disclosure is not limited to these example actions and that the collector component 130 can collect information regarding any suitable action taken by the application 110.

The collected information can be aggregated by an aggregation component 140. The aggregation component 140 can then format the aggregated information, for example, into a user-friendly presentation. The aggregation component 140 can provide the aggregated information to an output component 150.

In one example, the aggregation component 140 provides the aggregated information to the output component 150 once a threshold quantity of suspicious activity(ies). For example, the threshold quantity can be based upon information stored in a user profile 160. The information stored in the user profile 160 can be based, for example, upon user selection, enterprise selection, etc. In one example, the user profile 160 is dynamically updated by an adaptive component 170 based upon user action(s) taken in response to presentation of aggregated information, as discussed more fully below.

In one example, the aggregation component 140 provides the aggregated information to the output component 150 in response to determining that a particular suspicious activity(ies) have occurred. For example, the particular suspicious activity(ies) can be based upon information stored in the user profile 160 (e.g., user specified, enterprise-specified, dynamically adapted, etc.). In one example, the aggregation component 140 provides the aggregated information to the output component 150 in response to determining that a combination of suspicious activity(ies) have occurred. For example, the combination of suspicious activity(ies) can be based upon information stored in the user profile 160 (e.g., user-specified, enterprise-specified, dynamically adapted, etc.).

The output component 150 can provide the aggregated information to a user. For example, the output component 150 can display the aggregated information to the user. In another example, the output component 150 can cause the aggregated information to be present audibly to user (e.g., speech output). In one example, a modality of presenting the aggregated information to the user is user-selectable.

Figure 2:
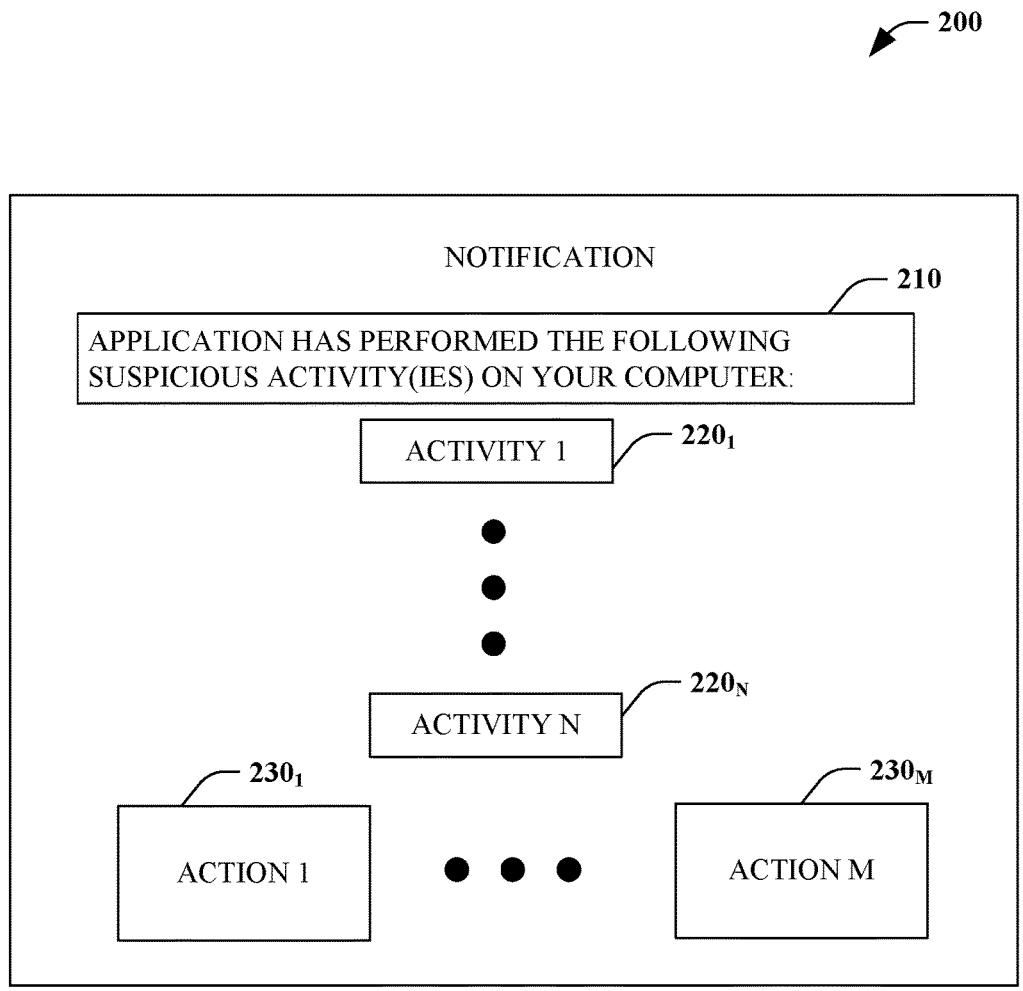
FIG. 2 illustrates an exemplary user interface of an exemplary embodiment.

Turning to FIG. 2, an exemplary user interface 200 of an exemplary embodiment is illustrated. The user interface 200 includes a notification area 210 that indicates to a user reason(s) (e.g., behavior(s) and/or activity(ies)) that a particular application has been identified as a potentially unwanted application. The user interface 200 further includes one or more activity(ies) 220 that specify (e.g., in user-friendly language) activity(ies) and/or behavior(s) that the particular application has engaged in which the system 100 has identified as suspicious. Finally, the user interface 200 includes one or more action(s) which the user can take with respect to the application based on the activity(ies) 220 presented. In one example, actions 220 include "Not Concerned" by which a user notifies the system 100 to take no action with respect to the application 110. Another example action 220 is "Learn More" by which a user notifies the system 100 to provide additional information, for example, regarding one or more of the activity(ies) 210 identified. Another example action 220 is "Block it!" by which the user notifies the system 100 to block the application 110.

Referring back to FIG. 1, an input component 180 receives user input regarding an action to be taken in response to presentation of the aggregated information via the output component 150. In one example, the user input is received via a touchscreen input selection and/or a mouse click. In one example, the user input is received via a voice input using a microphone. For example, using the microphone, the user can say "not concerned", "learn more" and/or "block it" which, using voice recognition software, the input component 180 maps to an appropriate action.

Based on the received user input regarding an action, an action component 190 takes an action regarding the application 110. In one example, actions include "Not Concerned", "Learn More" and/or "Block it". Example actions include allowing the application 110 to execute without interruption, providing additional information to the user regarding the application 110 and/or the suspicious activity(ies) via the output component 150 and/or blocking the application 110 from running.

Another example action is to execute the application 110 in a reduced access mode (e.g., partial sandbox) in which the application is allowed to run. However, in this reduced access mode, the application 110 will fail to perform particular operation(s). For example, the particular operation(s) which the application is not permitted to perform may be based on user input received via the input component 180, information stored in the user profile 160 and/or enterprise-specific setting(s). Operations which the application 110 can be prevented from performing include, for example, network access, ability to access a particular file and/or folder, ability to change browser setting(s) and/or configuration(s), and the like.

Another example action is to execute the application 110 in a controlled access mode in which the application 110 is allowed to execute but is provided control data in response to request(s) for user data and/or information about the user's computer. For example, the control data (e.g., control email address, social network profile, credit card number, file, image, etc.) can be unique to the application 110, the user and/or the user's computer, to allow the system 100 to track use of the control data and later infer a causal connection with identified undesirable behavior.

For example, by providing a control email address instead of a user's real email address in response to a request from the application 110, the system 100 can monitor message(s) sent to the control email address. Over a period of time, when the system 100 determines that undesirable messages are being sent to the control email address (e.g., phishing attack(s), targeted advertisement(s), spam and the like), the system 100 can statistically determine that the application 110 is an unwanted application and block further access to the application 110. By using control data instead of real user data, personally identifiable information of the user can be prevented from being transmitted from the system 100, while allowing a determination of whether or not the potentially unwanted application is unwanted. While use of a control email address is set forth, those skilled in the art will recognize that control data can be provided in place of any suitable requested information.

Optionally, based upon action(s) taken by the user, the adaptive component 170 can modify information collected by the collector component 130. For example, over a period of time, the adaptive component 170 can learn that a user is not concerned with a particular action (e.g., modification of registry). Based upon the user's action over the period of time, the adaptive component 170 can notify the collector component 130 that the particular action is not of concern to the user. Based upon this notification, the collector component 130 can modify their behavior (e.g., by not collecting information regarding the particular action).

In one example, notification is provided by the adaptive component 170 updating the stored user profile 160 based on action(s) taken by the user. The updated stored user profile 160 can then be used by the collector component 130 when determining information to be collected. In one example, a user can modify a stored user profile 160, for example, to explicitly identify action(s) and/or behavior(s) about which that the particular user is concerned and/or is not concerned.

Finally, in one example, information collected by the collector component 130 (e.g., regarding activity(ies) of the application) and/or information regarding action(s) taken by the user can be provided, for example, to a service (e.g., cloud-based service). In one example, in doing so, any personally identifiable information can be prevented from being transmitted from the system 100. The service can aggregate the information provided, for example, to be shared with application developer(s) and/or owner(s) so the application developer(s) and/or owner(s) can adjust their respective application(s) to avoid performing activity(ies) which user(s) find objectionable.

Figure 3:
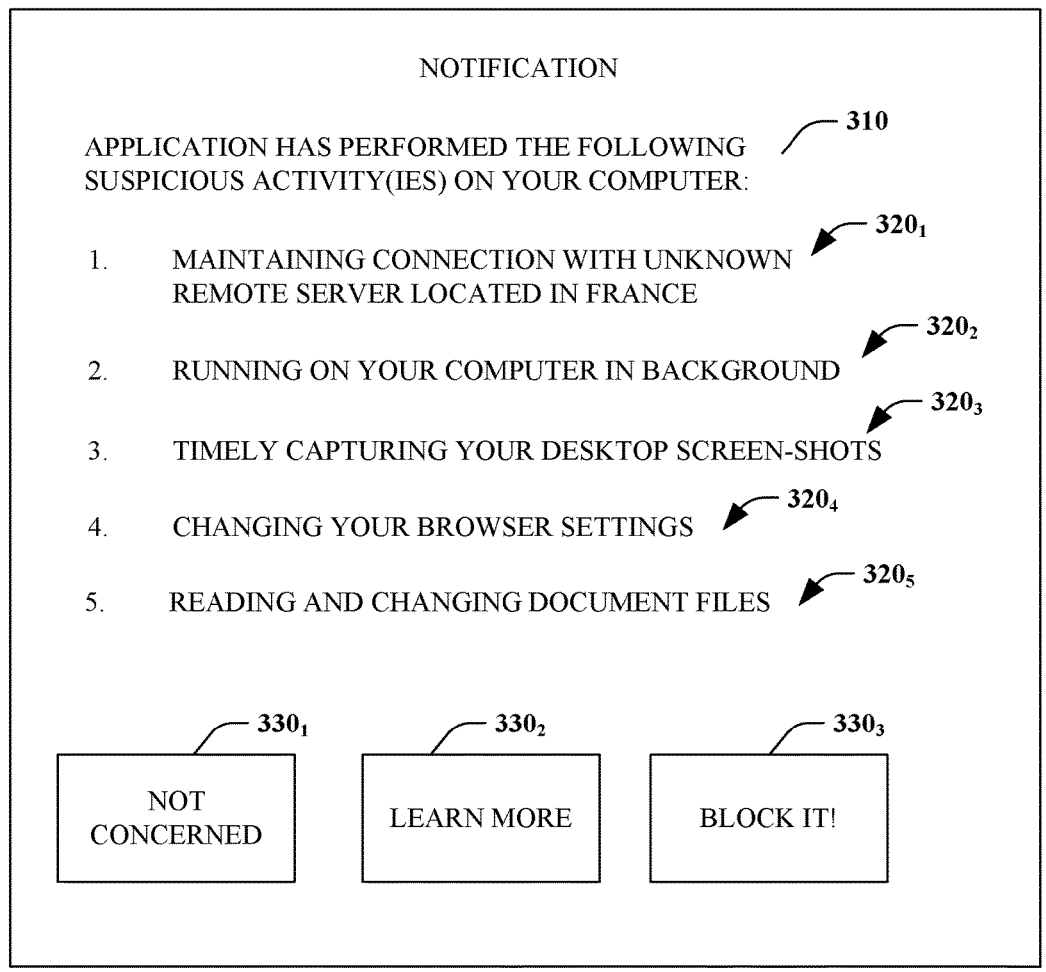
FIG. 3 illustrates an exemplary user interface of an exemplary embodiment.

Turning to FIG. 3, an exemplary user interface 300 of an exemplary embodiment is illustrated. The user interface 300 includes a notification area 310 that indicates to a user reason(s) (e.g., behavior(s) and/or activity(ies)) that a particular application has been identified as a potentially unwanted application.

The user interface 300 further includes a plurality of activities 320: "Maintaining connection with unknown remote server located in France" $320_1$, "Running on your computer in background" $320_2$, "Timely capturing your desktop screen-shots" $320_3$, "Changing your browser settings" $320_4$ and "Reading and changing document files" $320_5$. Finally, the user interface 300 includes actions which the user can take with respect to the application based on the activities 320: "Not concerned" $330_1$, "Learn more" $330_2$ and "Block it!" $330_3$. By selecting "Not Concerned" $330_1$, the user notifies the system 100 to take no action with respect to the application 110. By selecting "Learn More" $330_2$, the user notifies the system 100 to provide additional information, for example, regarding one or more of the activity(ies) 320 identified. Finally, by selecting "Block it!" 330₃, the user notifies the system 100 to block the application 110.

Figure 4:
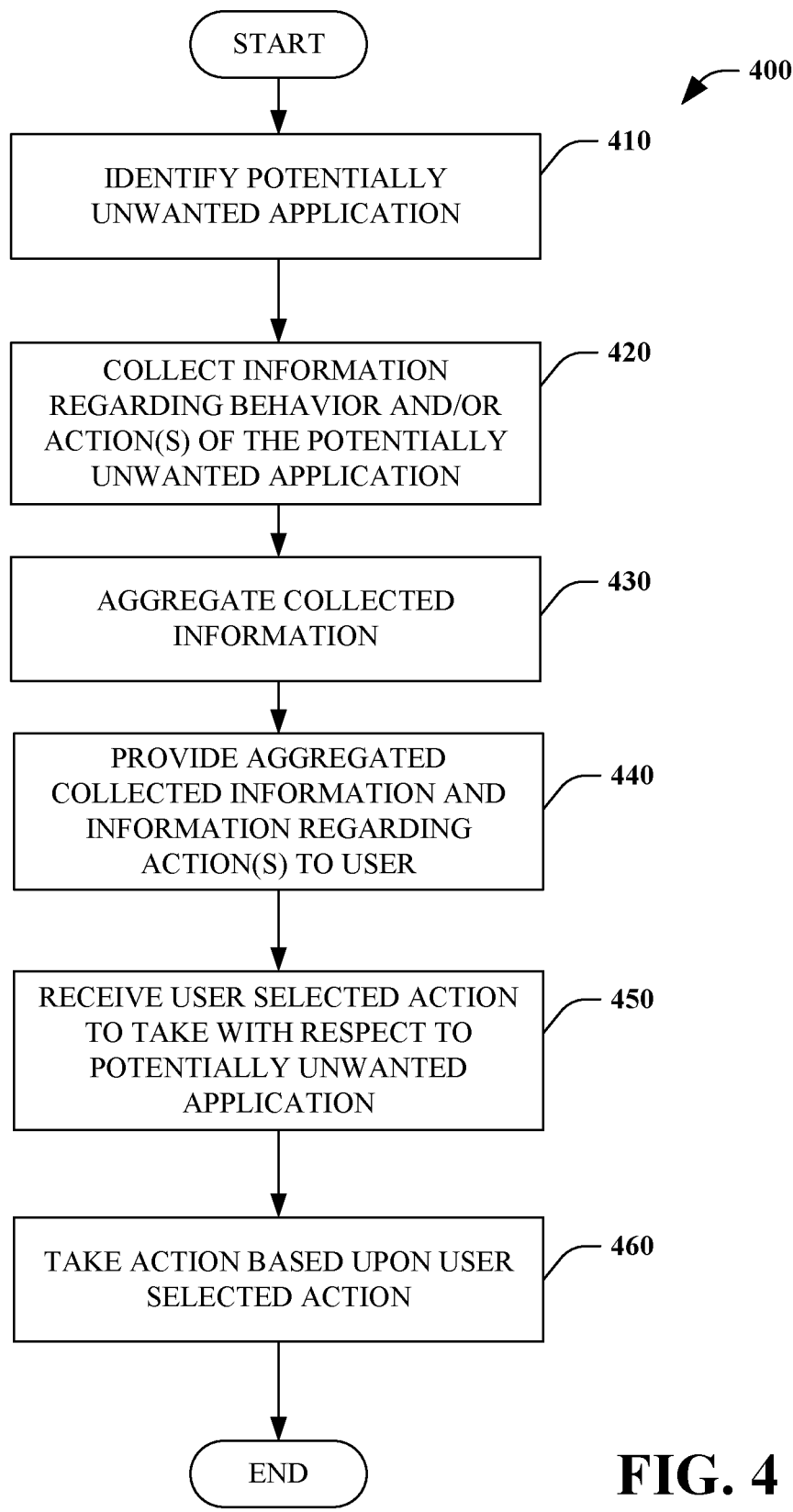
FIG. 4 illustrates an exemplary methodology of providing information regarding a potentially unwanted application.
Figure 5:
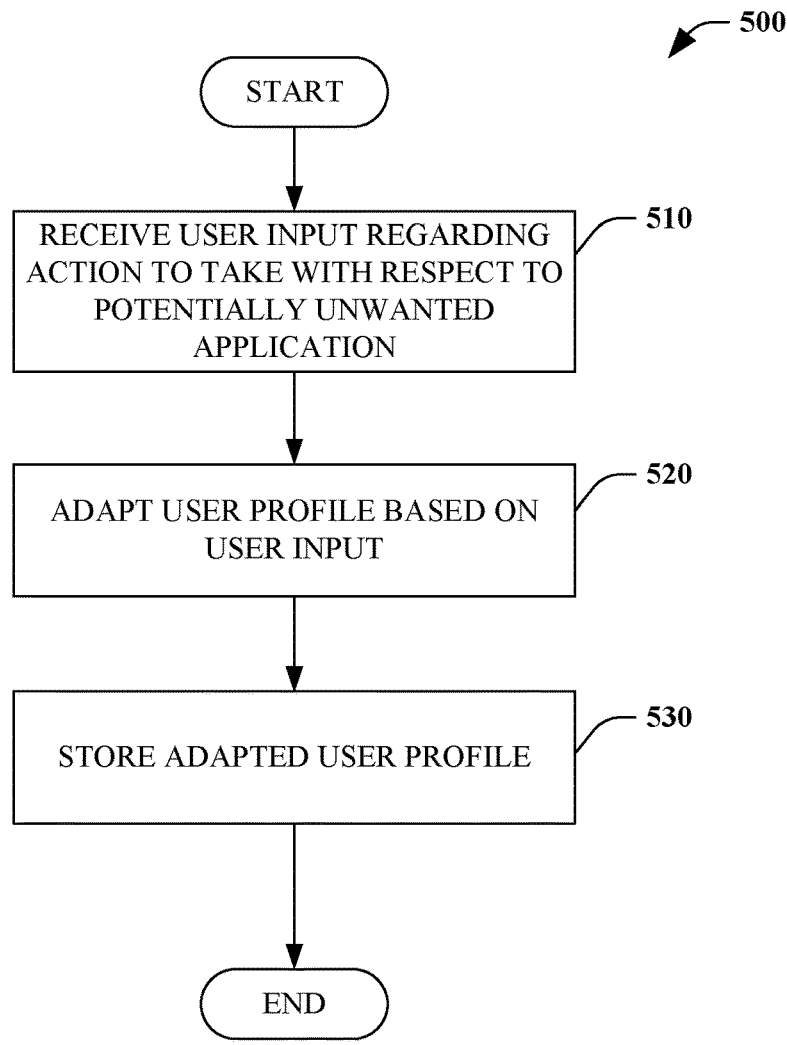
FIG. 5 illustrates an exemplary methodology of adapting a user profile is illustrated.
Figure 6:
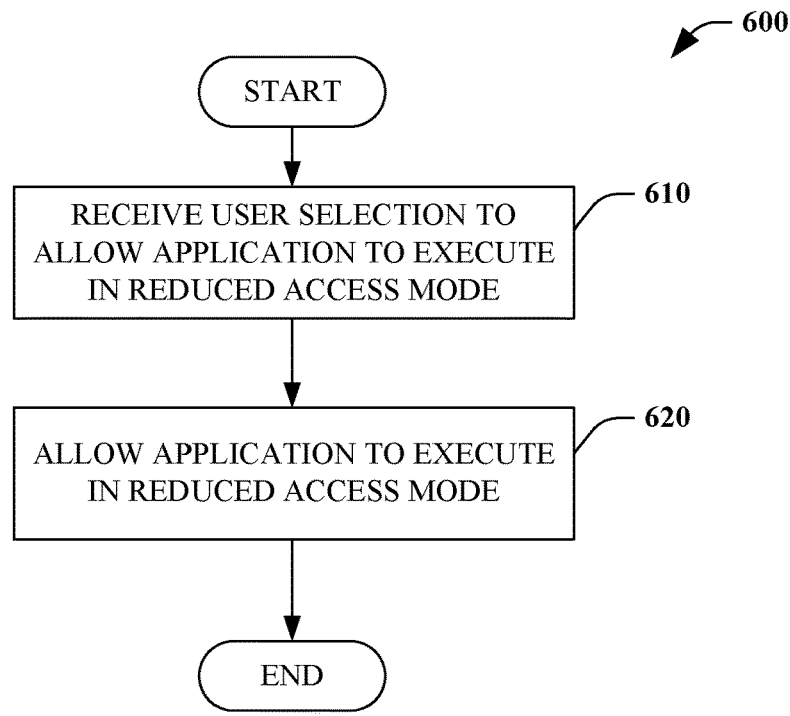
FIG. 6 illustrates an exemplary methodology of allowing an application to execute in a reduced access mode.

FIGS. 4-6 illustrate exemplary methodologies relating to providing information regarding a potentially unwanted application. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 4, an exemplary methodology 400 of providing information regarding a potentially unwanted application is illustrated. At 410, at potentially unwanted application is identified. For example, an application can be reviewed and identified as a potentially unwanted application based upon user-specified setting(s), enterprise-specified setting(s), information obtained from a service (e.g., cloud-based service), unfamiliarity of an anti-malware engine with the application (e.g., initial loading of the application on a computer system)

At 420, information regarding behavior and/or action(s) of the potentially unwanted application is collected. For example, information regarding one or more of the following suspicious actions taken by the application can be collected: communication with computer(s) in physically remote location(s), performance of potentially damaging action(s) to a user's computer (e.g., deleting and/or modifying file(s) and/or directory(ies)), performing surreptitious act(s) (e.g., reads file(s)), modifying setting(s) of a user's computer (e.g., registry, change browser setting(s), etc.), utilizing hardware and/or software component(s) of a user's computer (e.g., querying a database via a database application, display, keyboard, mouse, camera, microphone, modem connection, Bluetooth connection, network connection, scanner, printer, hard drive, flash drive, etc.) and the like.

At 430, the collected information is aggregated. For example, the collected information can be formatted into a user-friendly presentation. In one example, the aggregated information is filtered based on information stored in a user profile.

At 440, the aggregated, collected information and information regarding action(s) are provided to a user. In one example, the aggregated collected information is provided to a user once a threshold quantity of suspicious activity(ies). For example, the threshold quantity can be based upon information stored in a user profile. The information stored in the user profile can be based, for example, upon user selection, enterprise selection, etc. In one example, the user profile is dynamically updated by (e.g., an adaptive component 170) based upon user action(s) taken in response to presentation of aggregated information. For example, the aggregated, collected information can be provided to the user via a display and/or presented audibly to the user.

The action(s) provided to the user indicate action(s) which the user can take with respect to the application based on the aggregated, collected information (e.g., behavior and/or activity(ies)). In one example, actions include "Not Concerned" by which a user notifies the system to take no action with respect to the application. Another example action is "Learn More" by which a user notifies the system to provide additional information, for example, regarding one or more of the activity(ies) identified in the aggregated, collected information. Another example action is "Block it!" by which the user notifies the system to block the application.

At 450, a user selected action to take with respect to the potentially unwanted application is received. At 460, an action is taken based upon the user selected action. Example actions include allowing the application to execute without interruption, providing additional information to the user regarding the application and/or the suspicious activity(ies) and/or blocking the application from running.

Turning to FIG. 5, an exemplary methodology 500 of adapting a user profile is illustrated. At 510, user input regarding an action to take with respect to a potentially unwanted application is received.

At 520, a user profile is adapted (e.g., updated) based on the received user input. For example, over a period of time, the system 100 can learn that a user is not concerned with a particular action (e.g., modification of registry).

At 530, the adapted user profile is stored. In one example, the adapted user profile can be used to determine which behavior(s) and/or activity(ies) to track (e.g., by a collector component 130). In this manner, action(s) selected by a user can influence collecting and/or presentation of information to the user for further potentially unwanted application(s).

By passively allowing the user's selection to influence future collection and/or presentation, user satisfaction can be increased. For example, if a user has selected "take no action" with respect to a particular type of behavior and/or activity, the likelihood of the user performing a blocking action is decreased. Instead of displaying the particular type of behavior and/or activity as suspicious to the user (e.g., by adapting the user profile to the user's actions), the user will not be bothered with unnecessary interruption(s).

Next, referring to FIG. 6, an exemplary methodology 600 of allowing an application to execute in a reduced access mode is illustrated. At 610, user selection to allow an application to executed in reduced access mode is received. At 620, the application is allowed to execute in reduced access mode.

Described herein is a system for providing information regarding a potentially unwanted application. The system includes a computer comprising a processor and a memory, the memory includes a potential unwanted application identification component configured to review an application and identify the application as a potentially unwanted application. The memory further includes a collector component configured to collect information regarding at least one of a behavior or an action of the identified potentially unwanted application. The memory includes an aggregation component configured to aggregate the collected information, an output component configured to provide the aggregated collection information to a user, an input component configured to receive an input identifying an action to take regarding the aggregated collected information; and an action component configured to take the identified action regarding the identified potentially unwanted application.

The system can include an adaptive component configured to dynamically update a stored user profile, the stored user profile utilize by the collector component when collecting the information regarding the identified potentially unwanted application. The system can include wherein the collected information comprises information regarding an action that compromises security of information stored on the computer. The system can include wherein the collected information comprises information regarding at least one of communication with a computer in a physically remote location, performance of a damaging action to the computer or performance of a surreptitious act. The system can include wherein the collected information comprises information regarding utilization of at least one of a hardware component or software application of the computer. The system can include wherein the collected information comprises information regarding utilization of at least one of a display, a keyboard input, a mouse, a camera, a microphone, a modem connection, a Bluetooth connection, a network connection, a scanner, a printer, a hard drive or a flash drive of the computer.

The system can include wherein the potential unwanted application component identifies the application as a potentially unwanted application based upon at least one of a user-specified setting, an enterprise-specified setting, information obtains from a service or unfamiliarity of an anti-malware engine with the application. The system can include wherein the collector component utilizes a stored user profile when collecting the information regarding the identified potentially unwanted application. The system can include wherein the identified action comprises allowing the identified potentially unwanted application to executed in a reduced access mode. The system can further include wherein in the reduced access mode, the identified potentially unwanted application is not permitted to perform an operation comprising at least one of have network access, access a particular file, access a particular folder or change a browser setting. The system can include wherein the collector component is further configured to provide information regarding the identified action to a service remote to the computer.

Described herein is a method of providing information regarding a potentially unwanted application, including identifying an application as a potentially unwanted application, collecting information regarding at least one of a behavior or an action of the potentially unwanted application, providing the collected information to a user, receiving a user selection regarding an action to be taken regarding the potentially unwanted application; and taking the user selection action with regard to the potentially unwanted application. The method can further include based on the user selection action, dynamically updating a stored user profile, the stored user profile utilized when collecting the information.

The method can further include wherein the collected information comprises information regarding at least one of communication with a computer in a physically remote location, performance of a damaging action to the computer or performance of a surreptitious act. The method can further include wherein the collected information comprises information regarding utilization of at least one of a hardware component or software application of a computer. The method can further include wherein the identifying an application as a potentially unwanted application is based upon at least one of a user-specified setting, an enterprise-specified setting, information obtains from a service or unfamiliarity of an anti-malware engine with the application. The method can further include wherein the collecting information regarding a behavior and an action of the potentially unwanted application is based upon a stored user profile. The method can further include wherein the user selected action comprises allowing the identified potentially unwanted application to executed in a reduced access mode.

Described herein is a computer storage media storing computer-readable instructions that when executed cause a computing device to identify an application as a potentially unwanted application, collect information regarding at least one of a behavior or an action of the potentially unwanted application, provide the collected information to a user, receive a user selection regarding an action to be taken regarding the potentially unwanted application; and take the user selection action with regard to the potentially unwanted application. The computer storage media can further store computer-readable instructions that when executed case the computing device to, based on the user selection action, dynamically update a stored user profile, the stored user profile utilized when collecting the information.

Figure 7:
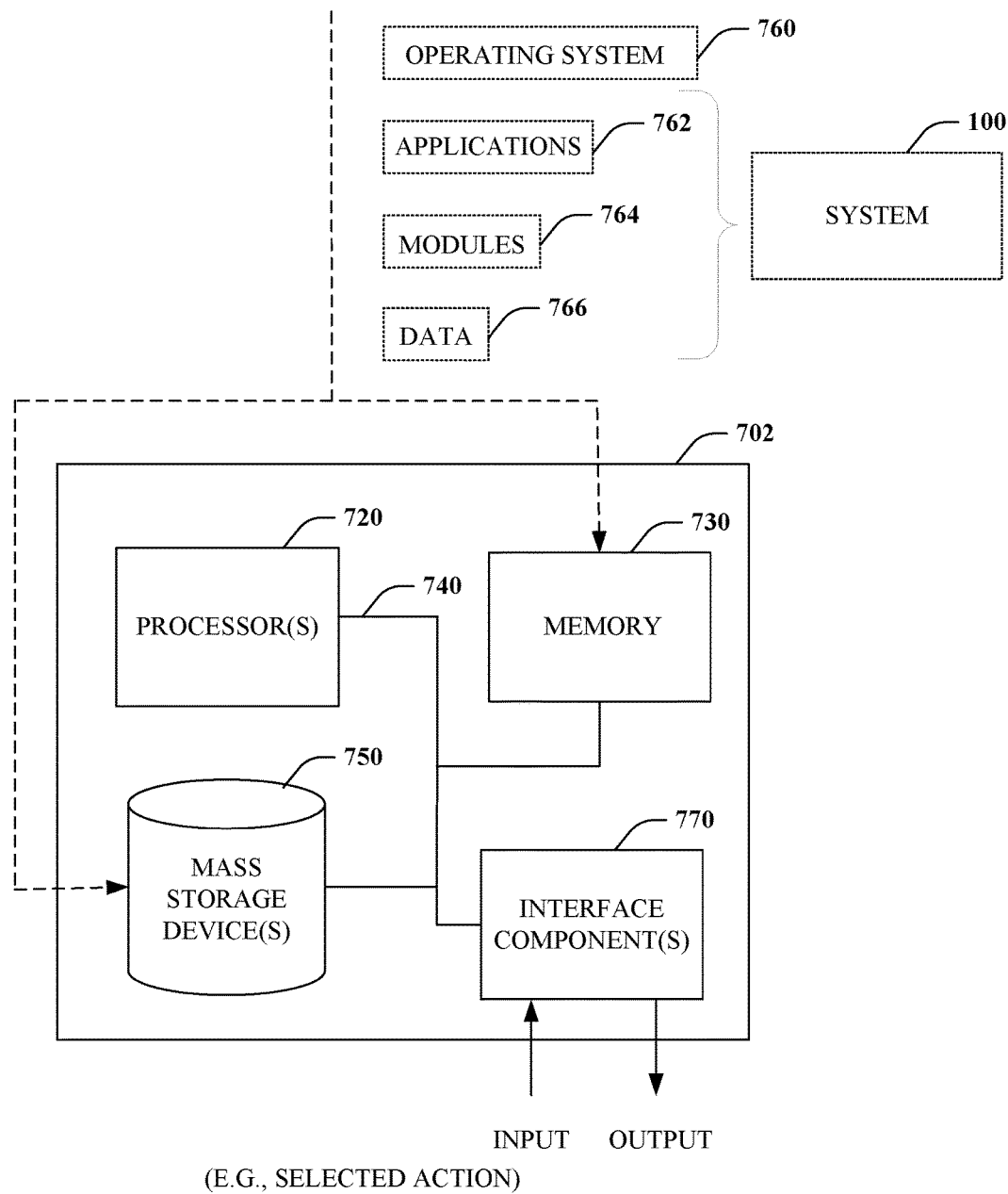
FIG. 7 is a functional block diagram that illustrates an exemplary computing system.

With reference to FIG. 7, illustrated is an example general-purpose computer or computing device 702 (e.g., desktop, laptop, tablet, watch, server, hand-held, programmable consumer or industrial electronics, set-top box, game system, compute node, etc.). For instance, the computing device 702 may be used in a system for for providing information regarding a potentially unwanted application.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby. In one example, application 762 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for providing information regarding a potentially unwanted application, comprising:
    a computer comprising a processor and a memory, the memory comprising:
    a potential unwanted application identification component configured to, by the computer, review an application and identify the application as a potentially unwanted application;
    a collector component configured to, based, at least in part, upon information in a stored user profile, collect information regarding the identified potentially unwanted application performing at least one of deleting a file, modifying a file, reading a file, modifying a setting of a registry of the computer, or changing a browser setting of the computer;

an aggregation component configured to aggregate the collected information;

an output component configured to, via a user interface of the computer, provide the aggregated collection information;

an input component configured to, via the user interface of the computer, in response to the provided aggregated collection information, receive an input identifying an action to take regarding the aggregated collected information; and an action component configured to, by the computer, take the identified action regarding the identified potentially unwanted application.

2. The system of claim 1, further comprising an adaptive component configured to dynamically update the stored user profile, the stored user profile utilize by the collector component when collecting the information regarding the identified potentially unwanted application.

3. The system of claim 1, wherein the collected information comprises information regarding an action that compromises security of information stored on the computer.

4. The system of claim 1, wherein the collected information comprises information regarding at least one of communication with a computer in a physically remote location, performance of a damaging action to the computer or performance of a surreptitious act.

5. The system of claim 1, wherein the collected information comprises information regarding utilization of at least one of a display, a keyboard input, a mouse, a camera, a microphone, a modem connection, a Bluetooth connection, a network connection, a scanner, a printer, a hard drive or a flash drive of the computer.

6. The system of claim 1, wherein the potential unwanted application component identifies the application as a potentially unwanted application based upon at least one of a user-specified setting, an enterprise-specified setting, information obtains from a service or unfamiliarity of an anti-malware engine with the application.

7. The system of claim 1, wherein the collector component utilizes a stored user profile when collecting the information regarding the identified potentially unwanted application.

8. The system of claim 1, wherein the collector component is further configured to provide information regarding the identified action to a service remote to the computer.

9. The system of claim 1, wherein the identified action comprises, in response to a request for user data, providing control data to the potentially unwanted application, wherein the control data is unique to at least one of the potentially unwanted application, a user, or the computer, to allow tracking of use of the control data by the potentially unwanted application.

10. The system of claim 1, wherein the identified action comprises allowing the identified potentially unwanted application to executed in a reduced access mode.

11. The system of claim 10, wherein in the reduced access mode, the identified potentially unwanted application is not permitted to perform an operation comprising at least one of have network access, access a particular file, access a particular folder or change a browser setting.

12. A computer-implemented method of providing information regarding a potentially unwanted application, comprising:

by the computer, identifying a potentially unwanted application;

based, at least in part, upon information in a stored user profile, collecting information regarding the potentially unwanted application performing at least one of deleting a file, modifying a file, reading a file, or changing a browser setting of the computer;

via a user interface of the computer, providing the collected information;

via the user interface of the computer, in response to the provided collected information, receiving a selection regarding an action to be taken regarding the potentially unwanted application;

by the computer, taking the selected action with regard to the potentially unwanted application; and updating the stored user profile based upon the selection.

13. The computer-implemented method of claim 12, wherein the collected information comprises information regarding at least one of communication with a computer in a physically remote location, performance of a damaging action to the computer or performance of a surreptitious act.

14. The computer-implemented method of claim 12, wherein the identifying an application as a potentially unwanted application is based upon at least one of a user-specified setting, an enterprise-specified setting, information obtains from a service or unfamiliarity of an anti-malware engine with the application.

15. The method of claim 12, wherein the collecting information regarding a behavior and an action of the potentially unwanted application is based upon the stored user profile.

16. The method of claim 12, wherein the user selected action comprises allowing the identified potentially unwanted application to executed in a reduced access mode.

17. The computer-implemented method of claim 12, wherein the selected action comprises providing control data in response to a request for user data by the potentially unwanted application.

18. The computer-implemented method of claim 12, wherein the control data is unique to at least one of the potentially unwanted application, a user, or the computer, to allow tracking of use of the control data by the potentially unwanted application.

19. A computer storage media storing computer-readable instructions that when executed cause a computing device to:

by the computing device, identify an application as a potentially unwanted application;

based, at least in part, upon information in a stored user profile, collect information regarding the potentially unwanted application performing at least one of deleting a file, modifying a file, reading a file, modifying a setting of a registry of the computing device, or changing a browser setting of the computing device;

via a user interface of the computing device, provide the collected information;

via the user interface of the computing device, in response to the provided collected information, receive a selection regarding an action to be taken regarding the potentially unwanted application; and by the computing device, take the selected action.

20. The computer storage media of claim 19, further storing computer-readable instructions that when executed case the computing device to:

based on the user selected action, dynamically update the stored user profile, the stored user profile utilized when collecting the information.

* * * * *